Sept. 20, 1938. B. A. PETERSON Re. 20,866

COMBUSTION CHAMBER

Original Filed Jan. 22, 1937

INVENTOR.
Bernard A. Peterson.
BY Daniel G. Sullen.
ATTORNEY.

Reissued Sept. 20, 1938

Re. 20,866

UNITED STATES PATENT OFFICE 20,866

COMBUSTION CHAMBER

Bernard A. Peterson, Detroit, Mich.

Original No. 2,097,214, dated October 26, 1937, Serial No. 121,798, January 22, 1937. Application for reissue October 26, 1937, Serial No. 171,083

5 Claims. (Cl. 158—1)

This application relates to combustion chambers, particularly for oil burners.

An object of the present invention is to provide a combustion chamber that will distribute the heat of combustion of an oil flame uniformly throughout a furnace and prevent too rapid an escape of hot gases.

Another object is to provide a combustion chamber that will dampen combustion noise.

A principal object is to provide a chamber that, while accomplishing the other objects, will be durable and will withstand the stresses of expansion and contraction. This object is accomplished by building a chamber out of a number of pieces which may expand and contract independently of each other, since they are not cemented together, but merely rest against each other. Thus it is not possible for an internal stress set up at one point of the structure to travel and multiply through a large part of the structure and cause a rupture.

The present construction also has the advantages of providing easy entry into the furnace and easy handling of the individual pieces which comprise the chamber.

A further object of this invention is to provide a vertical furnace construction including as an element thereof a vertical combustion chamber made in accordance with the invention.

Figure 2:
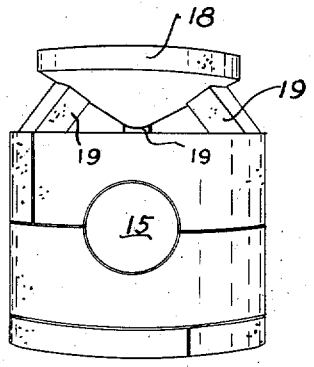

For an understanding of the invention, reference should be had to the accompanying drawing. In this drawing, Fig. 1 shows a furnace equipped with a combustion chamber of the invention;

Fig. 2 shows the combustion chamber per se with a combustion baffle associated therewith.

Figure 1:
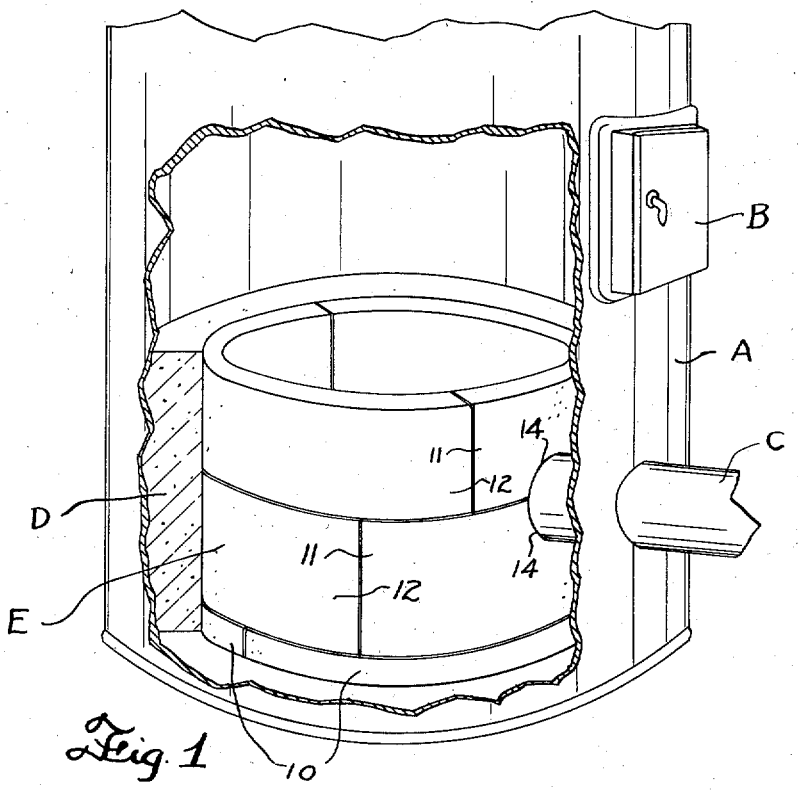

Referring to the drawing, it will be seen that Fig. 1 shows a vertical furnace A having a fire door B and an oil burner pipe C which projects thereinto and through a fire resisting cement backing D within which is a vertical refractory material combustion chamber E, the latter including a base and upon which is a shell.

The base or bottom consists of two semi-circular sectors 10 on which rest two shell segments 11 and 12, each of which is cast as half of a hollow cylinder. On top of the cylindrical portion thus formed by segments 11 and 12 rest two more segments 11 and 12. The upper segment 11 is so placed with respect to the lower segment 11 that the cutout portions 14 of each of these segments align to form a round hole 15 through which the oil burner pipe C may project into the chamber.

A baffle 18 of refractory material and of conical shape may be provided to provide additional refractory surface and thus increase the efficiency of the furnace. When such baffle is provided, it may be supported on the upper edges of the segments 11 and 12 by means of refractory legs 19, of which there are three, and these space the baffle from the segments.

The various shell segments are made in several lengths so that selected ones may be used for the purpose of providing different lengths for the combustion chamber as a whole. All the sectors and segments are so proportioned that they may be inserted into the furnace through the fire door opening and assembled within the furnace; the shell segments are thick enough and arcuately long enough to be capable of standing in place, when assembled, during the pouring and setting of the cement backing D, without themselves requiring cement for causing them to adhere in assembly. The only cement that is used for assembly purposes is the cement that is used to secure the supports 19 to the shell and to the baffle itself.

By virtue of the sectional construction of the chamber, stresses incident to expansion and contraction do not cause rupturing of the chamber or the sections, these being free to expand and contract.

I claim:

1. A vertical oil burner furnace provided with a relatively small firing opening and a fire door, a vertical cylinder of fire resisting cement engaging and lining the interior wall of the furnace, a combustion chamber of refractory material comprising a flat base made up of flat sectors and a vertical cylindrical shell composed of a relatively small number of annuli, each made up of a relatively small number of arcuate segments, each segment having a length and height considerably greater than its thickness and edges that are flat and plain, each segment and sector being so proportioned with respect to the firing opening as to be insertable into the furnace through the said opening, the segments being so thick and of such arcuate length that they can be assembled into a shell by being disposed on one another edgewise, and that when assembled they will maintain their assembled position without being adhesively secured to or interlocked to one another, all this being true even though the shell, when assembled, has its vertical surface out of contact with the furnace wall, and even though the cement lining or filler is not in place, the shell parts being so proportioned that they will maintain themselves in assembly while the cement lining or filling is being poured in and is setting in place around and in contact with the shell.

2. A vertical oil burner furnace provided with a relatively small firing opening and a fire door, a vertical cylinder of fire resisting cement engaging and lining the interior wall of the furnace, a combustion chamber of refractory material comprising a vertical cylindrical shell made up of a relatively small number of annuli, each made up of a relatively small number of segments, each segment having a length and height considerably greater than its thickness, and edges that are flat and plain, each segment being so proportioned with respect to the firing opening as to be insertable into the furnace through the said opening, the segments being so thick and of such arcuate length that they can be assembled into a shell by being disposed on one another edgewise, and that when assembled they will maintain their assembled position without being adhesively secured to or interlocked to one another, all this being true even though the shell, when assembled, has its vertical surface out of contact with the furnace wall, and even though the cement lining or filler is not in place, the shell parts being so proportioned that they will maintain themselves in assembly while the cement lining or filling is being poured in and is setting in place around and in contact with the shell.

3. A vertical oil burner furnace provided with a relatively small firing opening and a fire door, a vertical cylinder of fire resisting cement engaging and lining the interior wall of the furnace, a combustion chamber of refractory material comprising a flat base made up of flat sectors and a vertical cylindrical shell composed of a relatively small number of annuli, each made up of a relatively small number of arcuate segments, each segment having a length and height considerably greater than its thickness and edges that are flat and plain, each segment and sector being so proportioned with respect to the firing opening as to be insertable into the furnace through the said opening, the segments being so thick and of such arcuate length that they can be assembled into a shell by being disposed on one another edgewise, and that when assembled they will maintain their assembled position without being adhesively secured to or interlocked to one another, all this being true even though the shell, when assembled, has its vertical surface out of contact with the furnace wall, and even though the cement lining or filler is not in place, the shell parts being so proportioned that they will maintain themselves in assembly while the cement lining or filling is being poured in and is setting in place around and in contact with the shell, two adjacent segments having adjacent edges notched to form a hole in the shell.

4. A vertical oil burner furnace provided with a relatively small firing opening and a fire door, a vertical cylinder of fire resisting cement engaging and lining the interior wall of the furnace, a combustion chamber of refractory material comprising a vertical cylindrical shell made up of a relatively small number of annuli, each made up of a relatively small number of segments, each segment having a length and height considerably greater than its thickness, and edges that are flat and plain, each segment being so proportioned with respect to the firing opening as to be insertable into the furnace through the said opening, the segments being so thick and of such arcuate length that they can be assembled into a shell by being disposed on one another edgewise, and that when assembled they will maintain their assembled position without being adhesively secured to or interlocked to one another, all this being true even though the shell, when assembled, has its vertical surface out of contact with the furnace wall, and even though the cement lining or filler is not in place, the shell parts being so proportioned that they will maintain themselves in assembly while the cement lining or filling is being poured in and is setting in place around and in contact with the shell, two adjacent segments having adjacent edges notched to form a hole in the shell.

5. A vertical oil burner furnace provided with a relatively small firing opening and a fire door, a vertical cylinder of fire resisting cement engaging and lining the interior wall of the furnace, a combustion chamber of refractory material comprising a vertical cylindrical shell made up of a relatively small number of annuli, each made up of a relatively small number of segments, each segment having a length and height considerably greater than its thickness, and edges that are flat and plain, each segment being so proportioned with respect to the firing opening as to be insertable into the furnace through the said opening, the segments being so thick and of such arcuate length that they can be assembled into a shell by being disposed on one another edgewise, and that when assembled they will maintain their assembled position without being adhesively secured to or interlocked to one another, all this being true even though the shell, when assembled has its vertical surface out of contact with the furnace wall, and even though the cement lining or filler is not in place, the shell parts being so proportioned that they will maintain themselves in assembly while the cement lining or filling is being poured in and is setting in place around and in contact with the shell, two adjacent segments having adjacent arcuate edges notched to form a hole in the shell.

BERNARD A. PETERSON.